S. J. DUNKLEY.
APPARATUS AND PROCESS FOR PEELING FRUIT AND VEGETABLES.
APPLICATION FILED NOV. 13, 1916. RENEWED JAN. 8, 1921.
1,396,268.
Patented Nov. 8, 1921.
9 SHEETS—SHEET 3.
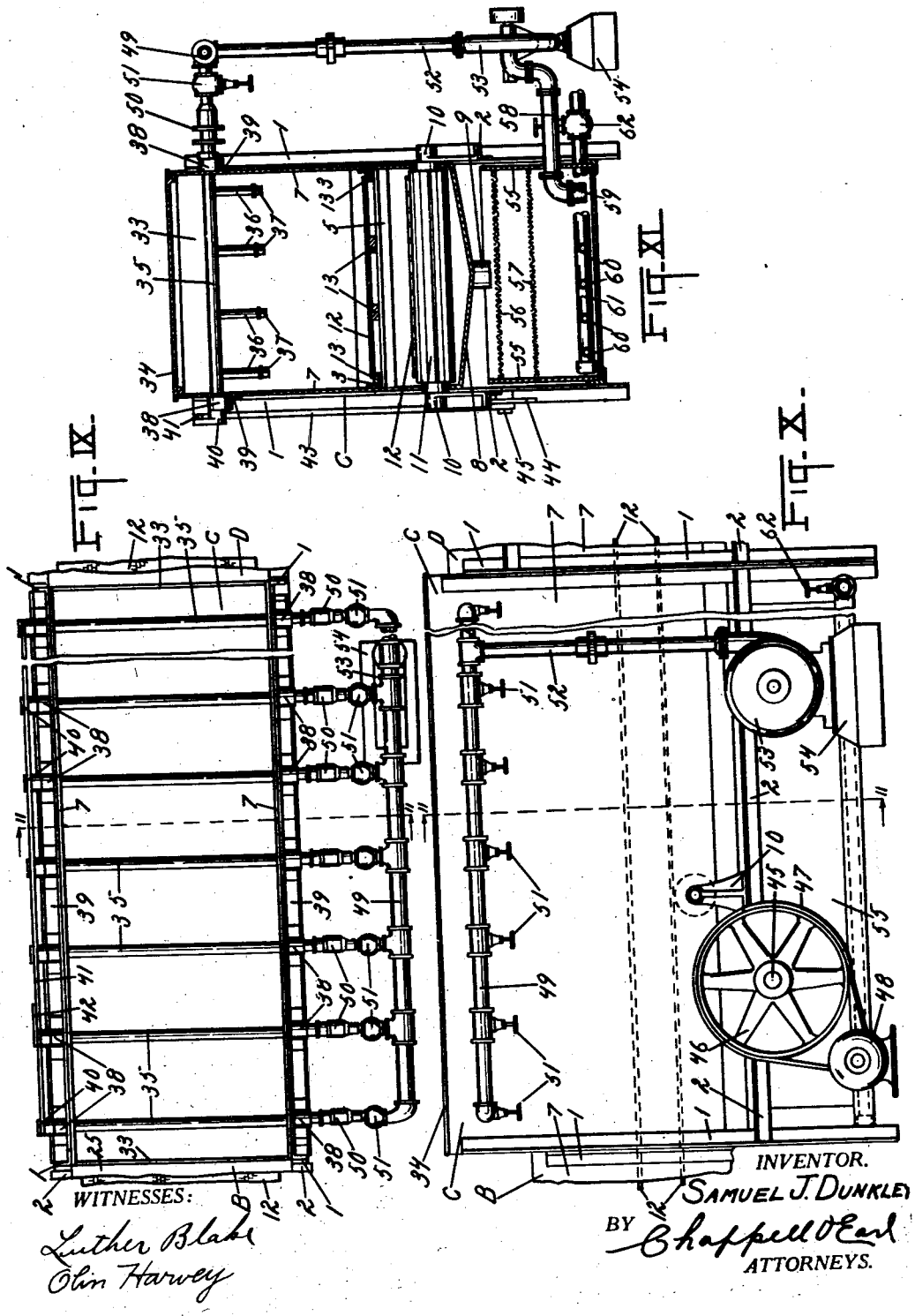
INVENTOR.
SAMUEL J. DUNKLEY
BY
ATTORNEYS.
WITNESSES:
Luther Blake
Olin Harvey S. J. DUNKLEY.
APPARATUS AND PROCESS FOR PEELING FRUIT AND VEGETABLES.
APPLICATION FILED NOV. 13, 1916. RENEWED JAN. 8, 1921.
1,396,268.
Patented Nov. 8, 1921.
9 SHEETS—SHEET 4.
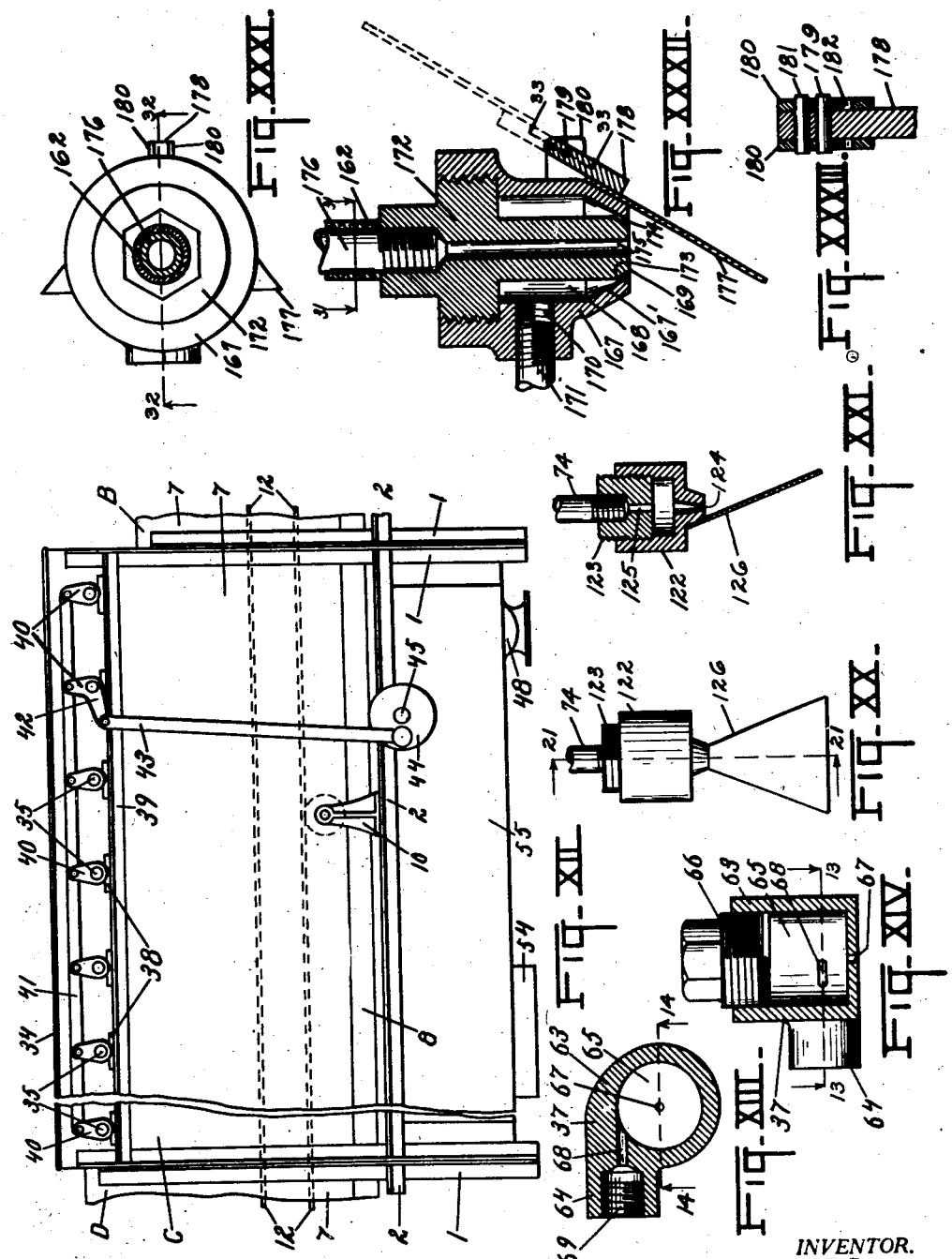
WITNESSES:
Luther Blake
Olin Harvey
INVENTOR.
Samuel J. Dunkley
BY Chappell & Earl
ATTORNEYS.

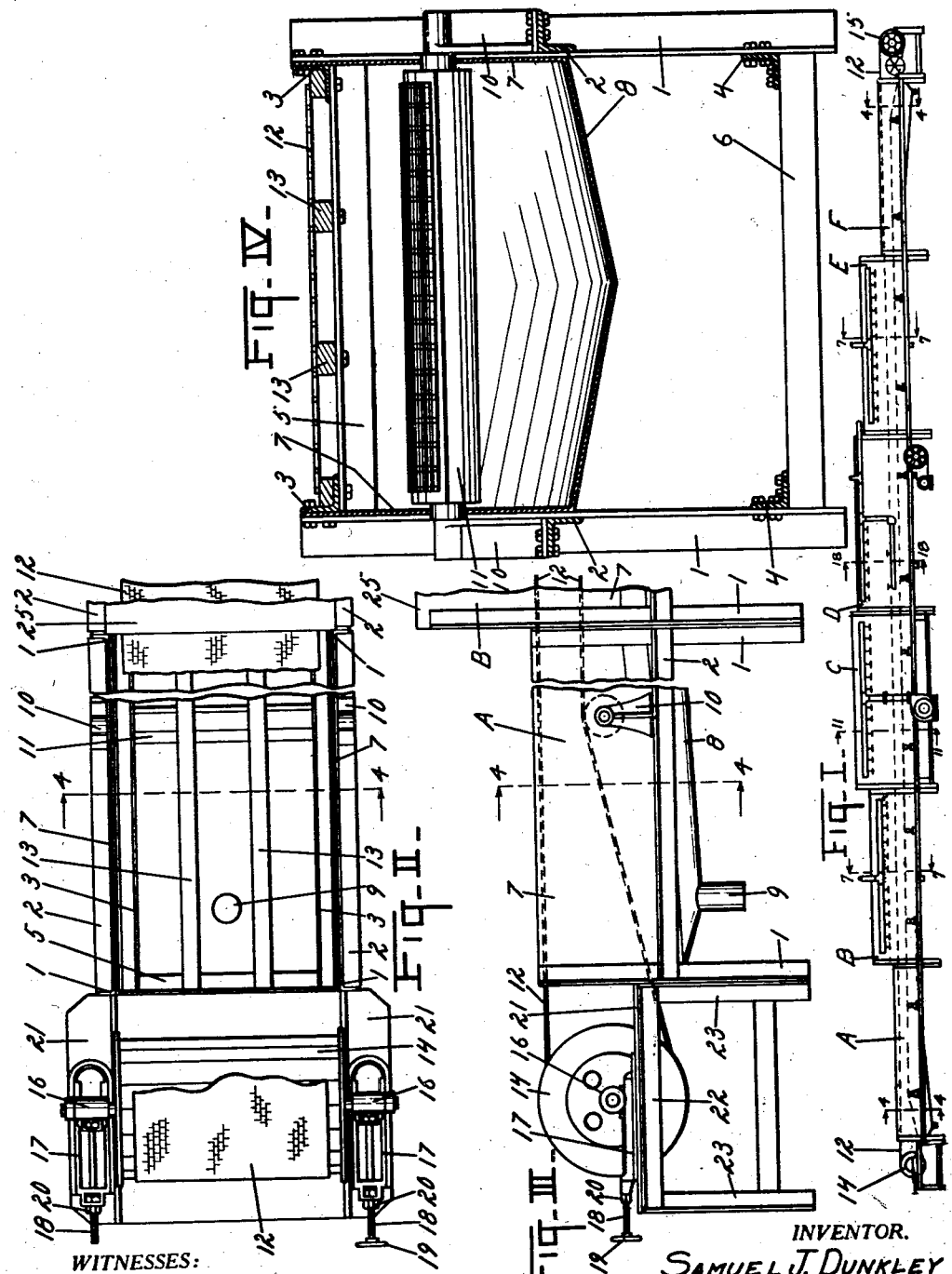

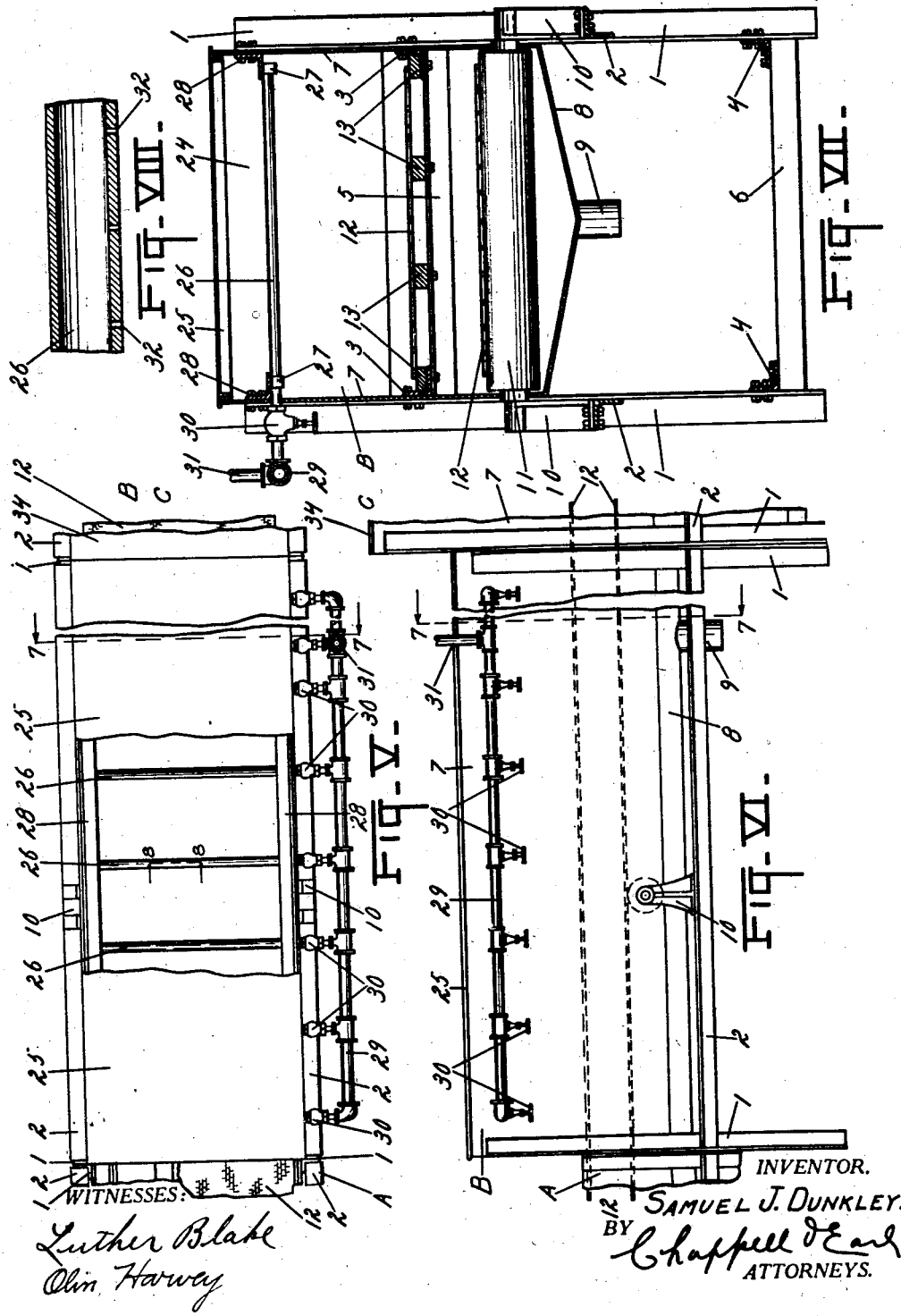

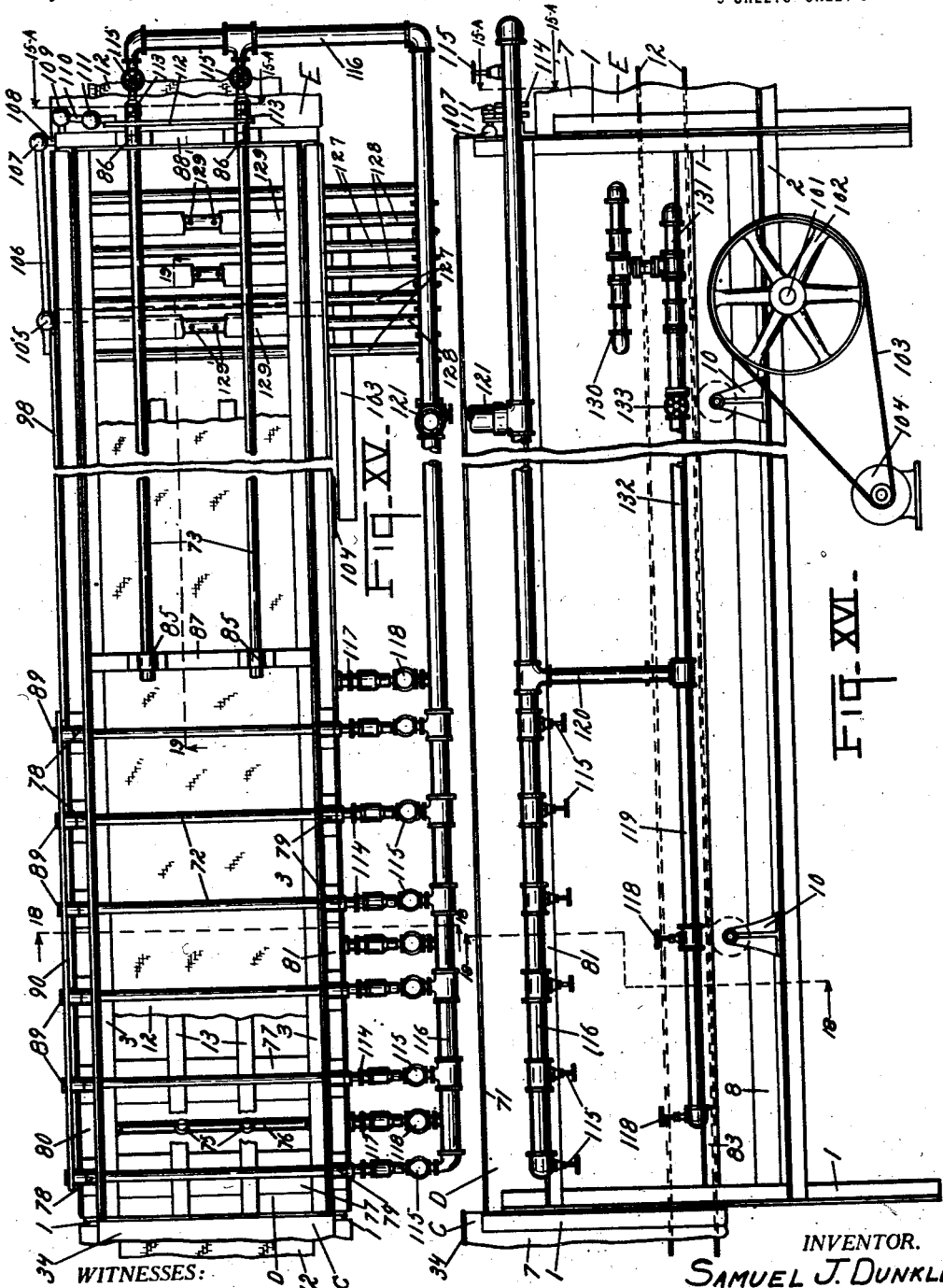
S. J. DUNKLEY.
APPARATUS AND PROCESS FOR PEELING FRUIT AND VEGETABLES.
APPLICATION FILED NOV. 13, 1916. RENEWED JAN. 8, 1921.
1,396,268.
Patented Nov. 8, 1921.
9 SHEETS—SHEET 5.
INVENTOR.
SAMUEL J. DUNKLEY
BY
ATTORNEYS.

S. J. DUNKLEY.
APPARATUS AND PROCESS FOR PEELING FRUIT AND VEGETABLES.
APPLICATION FILED NOV. 13, 1916. RENEWED JAN. 8, 1921.
1,396,268.
Patented Nov. 8, 1921.
9 SHEETS—SHEET 6.
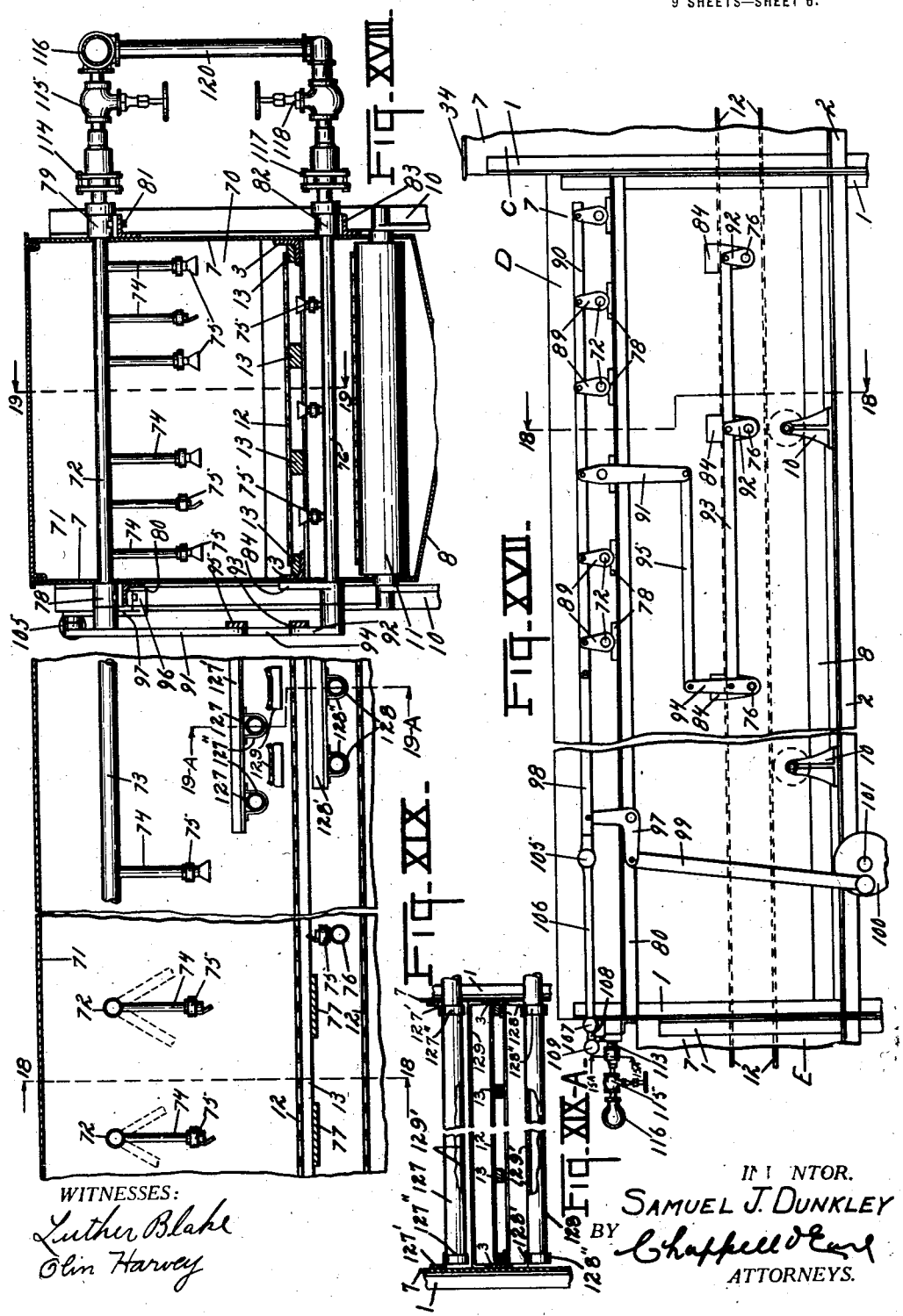
WITNESSES:
Luther Blake
Olin Harvey
INVENTOR.
SAMUEL J. DUNKLEY
BY
ATTORNEYS.

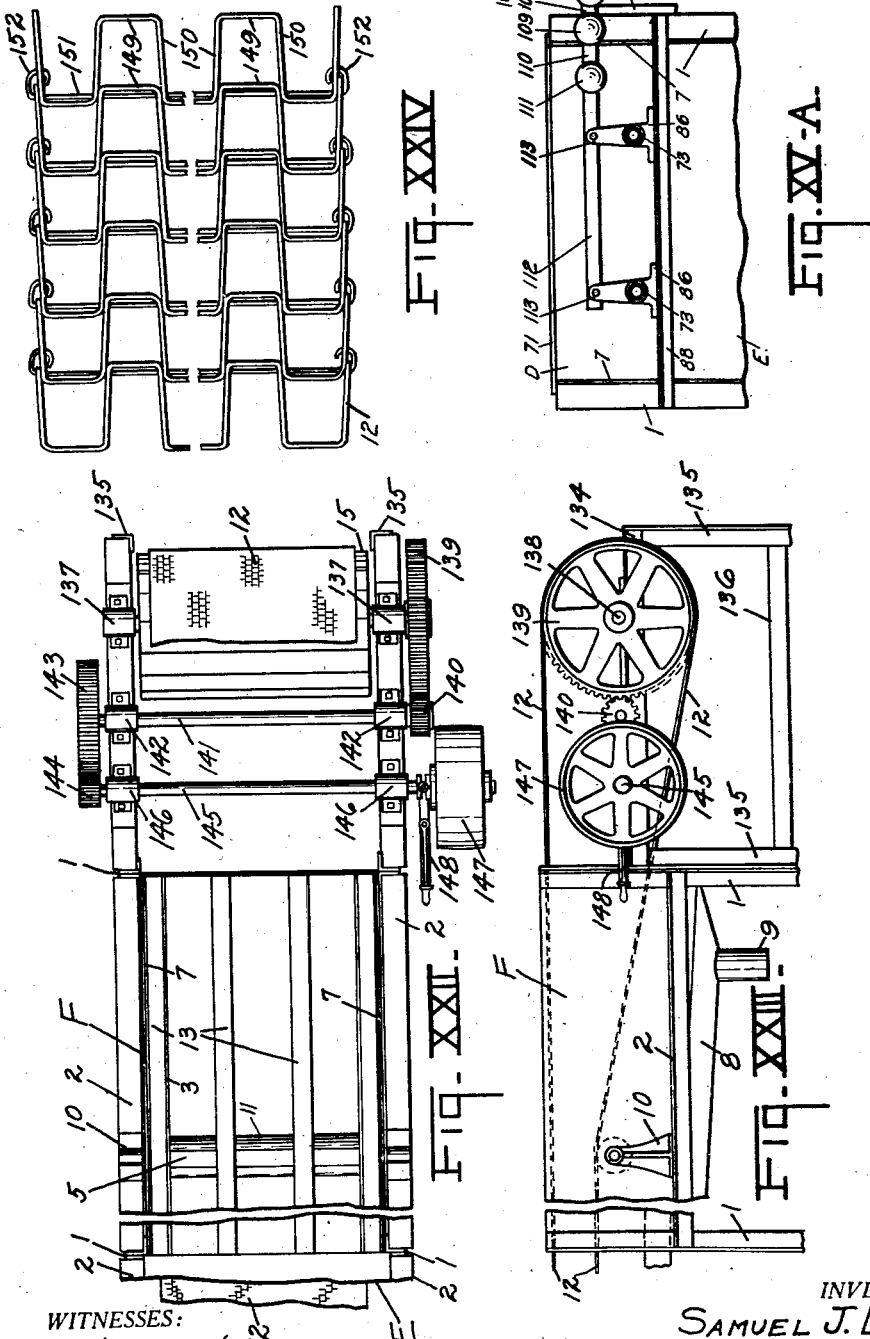

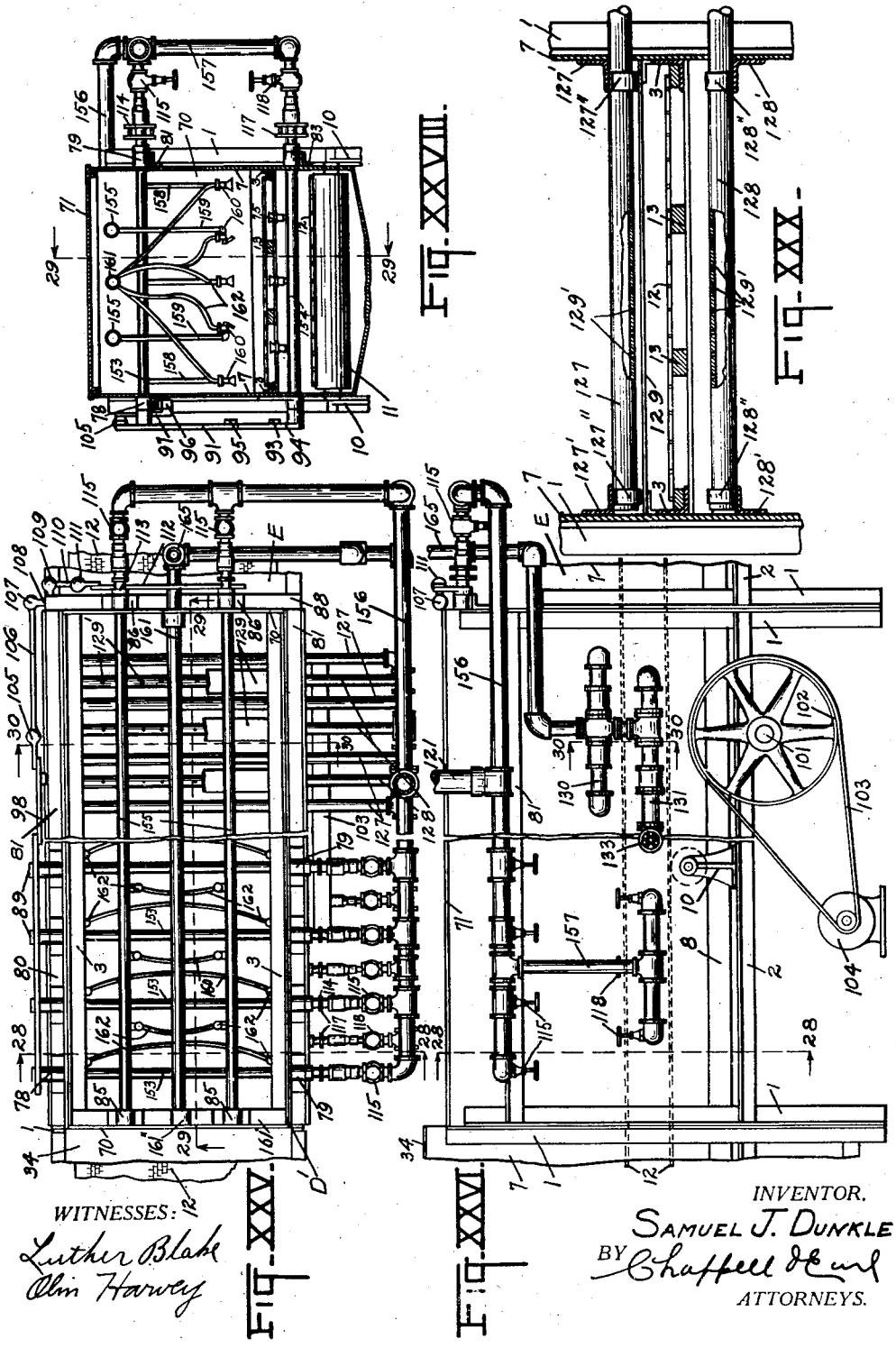

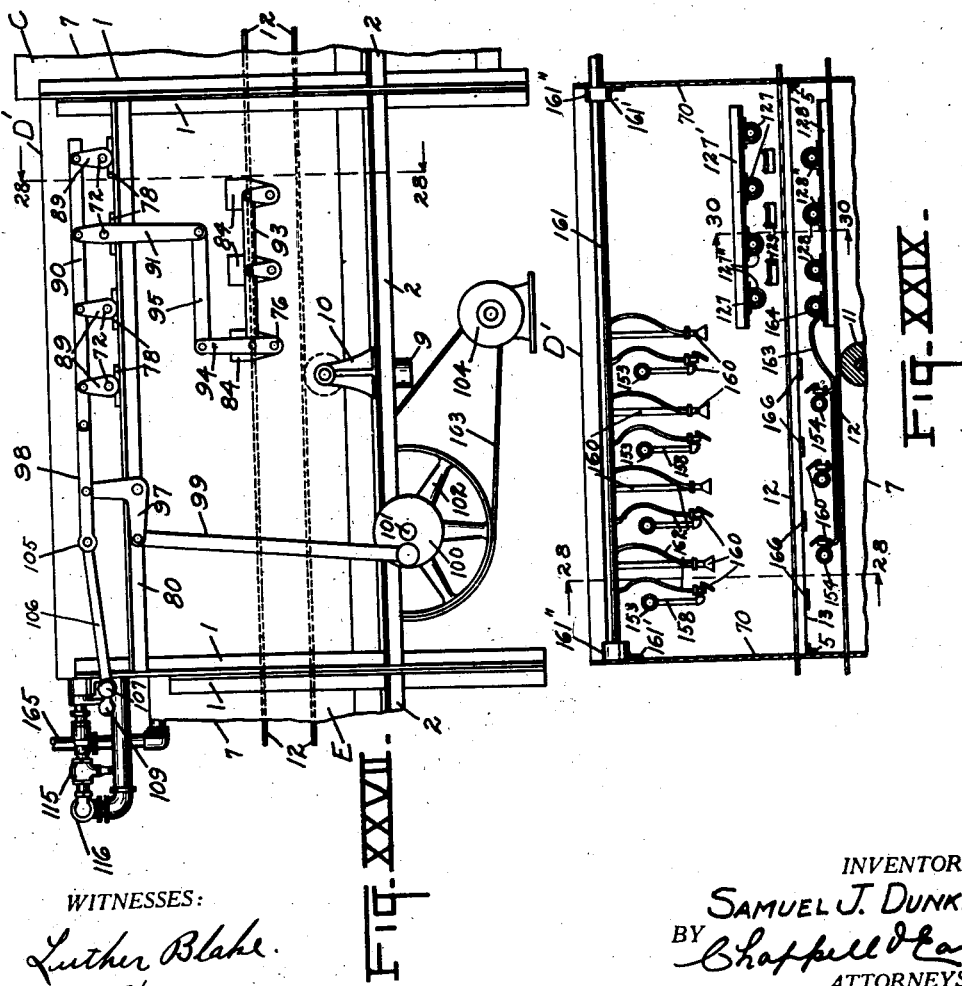

UNITED STATES PATENT OFFICE.

SAMUEL J. DUNKLEY, OF OAKLAND, CALIFORNIA, ASSIGNOR TO DUNKLEY COMPANY, OF KALAMAZOO, MICHIGAN, A CORPORATION OF MICHIGAN.

APPARATUS AND PROCESS FOR PEELING FRUIT AND VEGETABLES.

1,396,268.   Specification of Letters Patent.   Patented Nov. 8, 1921.

Application filed November 13, 1916, Serial No. 131,162. Renewed January 8, 1921. Serial No. 435,979.

*To all whom it may concern:*

Be it known that I, SAMUEL J. DUNKLEY, a citizen of the United States, residing at Oakland, California, have invented certain new and useful Improvements in Apparatus and Processes for Peeling Fruit and Vegetables, of which the following is a specification.

This invention relates to improved apparatus and process for peeling fruit and vegetables, the process being especially adapted to the peeling of peaches.

The objects of the invention are,

First, to provide an improved means of removing the peel from peaches and vegetables by a lye process without subjecting the pulp of the peach or vegetable to undue cooking action.

Second, to provide improved means of so treating a peach that the exposed pulp part will not be subjected to the action of lye or any disintegrating chemical.

Third, to provide improved means of and method for distributing the skin disintegrating solution or preparation on the outer surface of the vegetable or peach.

Fourth, to provide an improved means and process of treating the peach whereby the full strength and activity of the chemical or disintegrating solution is secured upon the peel itself.

Fifth, to provide an improved feed apparatus and mechanism for delivering the peaches, fruit or vegetables to be peeled.

Sixth, to provide improved means and process of treating the surface of the peach to properly heat and prepare the skin of the same for receiving the lye or disintegrating solution.

Seventh, to provide improved means and process of delivering a spray of disintegrating solution, such as lye, upon the skin or outer surface of the fruit, vegetable or peach.

Eighth, to provide improved spray means and process for removing the disintegrated peel from the peach, fruit or vegetable.

Ninth, to provide improved means and process of treating and completely removing the traces of any disintegrating material or solution that has been applied to the surface of the fruit, vegetable or peach that is being subjected to the treatment.

Tenth, to provide improved blanching means for the fruit.

Eleventh, to provide improved actuating means for the various parts of such apparatus.

Twelfth, to provide improved means for handling and moving forward peaches or other fruit or vegetables in the apparatus and undergoing the process, without abrading, bruising or injuring the same, thus greatly lessening the waste, especially on soft and fully ripened peaches, and resulting in as high grade finished product as is obtainable from the raw material.

Thirteenth, to provide an improved method and apparatus for handling and peeling firm and soft peaches, or one or more grades of fruit or vegetables, without intermingling the same so that they pass side by side through the machine, as capable of inspection and handling as though run through separate independent machines.

Fourteenth, to provide improved process and means for eliminating the peel from the peaches without material action, chemical or mechanical, upon the pulp particularly of the exposed parts.

Further objects, and objects relating to details and economies of construction and operation, will definitely appear from the detailed description to follow.

I accomplish the objects of my invention by the devices and means described in the following specification. The invention is clearly defined and pointed out in the claims.

A structure which presents a preferred embodiment of my invention is fully illustrated in the accompanying drawing, forming a part of this specification, in which:

Figure I is a diagrammatic side elevation view of an apparatus embodying my invention, showing in diagram the feed section A, the heating section B, the lyeing or disintegrating section C, the spraying or skin removing section D, the washing and blanching section E, and the inspection section F.

Fig. II is a detail plan view of the feed section A, embracing the belt supporting means.

Fig. III is a detail side elevation of the structure appearing in Fig. II.

Fig. IV is a slightly enlarged detail cross-sectional view, taken on a line corresponding to line 4—4 of Figs. I, II and III, looking in the direction of the little arrows at the ends of the section lines, the section lines being at two points on Fig. I, through both feed section A and inspection section F, the parts being identical although different in function.

Fig. V is a detail plan view of the steaming or heating section B of the machine.

Fig. VI is an elevation view of the same.

Fig. VII is an enlarged detail cross-sectional view taken on a line corresponding to line 7—7 of Figs. I, V and VI, the section lines being at two points on Fig. I, through the heating section B and through the blanching section E, which are identical in form but different in function.

Fig. VIII is an enlarged detail longitudinal sectional view taken on a line corresponding to line 8—8 of Fig. V, showing the construction of the perforated steam pipe 26.

Fig. IX is an enlarged detail plan view of the lyeing or disintegrating section C of the machine.

Fig. X is a detail side elevation of the structure appearing in Fig. IX from the lower side of such figure.

Fig. XI is a detail transverse sectional view taken on a line corresponding to line 11—11 of Figs. I, IX and X, showing the details of the connection for delivering the heated lye solution in the form of a spray to the surface of the fruit, vegetable or peach that is being peeled.

Fig. XII is a detail elevation view of the section C from the left hand side or upper side of Fig. IX.

Fig. XIII is an enlarged detail sectional view taken through one of the disintegrator spray nozzles, on a line corresponding to line 13—13 of Fig. XIV.

Fig. XIV is a detail sectional view taken on a line corresponding to line 14—14 of Fig. XIII.

Fig. XV is a detail plan view of the peeling or washing section D.

Fig. XV^A is a detail elevation view partially in section, taken on a line corresponding to line 15^A 15^A of Figs. XV, XVI and XVII, showing the details of the construction for rocking the longitudinal spray pipes.

Fig. XVI is an elevation view of the structure appearing in Fig. XV taken from the right side or the front side of Fig. I, showing the details of the water connection and distribution.

Fig. XVII is a detail elevation view from the left hand side of the section D as it appears in Fig. XV.

Fig. XVIII is a detail cross-sectional view taken on a line corresponding to the irregular line 18—18 of Figs. I, XV, XVI, XVII and XIX.

Fig. XIX is a detail partial longitudinal sectional view taken on line corresponding to line 19—19 of Figs. XV and XVIII.

Fig. XIX^A is a detail transverse sectional view taken on a line corresponding to line 19^A 19^A of Figs. XIX and XV.

Fig. XX is an enlarged detail elevation view of one of the water spray nozzles.

Fig. XXI is a vertical sectional view taken on a line corresponding to line 21—21 of Fig. XX.

Fig. XXII is a detail plan view of the rear end of the machine showing the manner of connection of the belt pulley and driving means.

Fig. XXIII is an elevation view thereof from the front of Fig. I and the right hand of Fig. XXII.

Fig. XXIV is an enlarged detail view of a section of the open conveyer belt or chain.

Fig. XXV is an enlarged detail view of a modification of a preferred form of the spray and steam means for certain purposes combining the washing and blanching operations.

Fig. XXVI is a side elevation of the same taken from the right hand of Fig. XXV.

Fig. XXVII is an elevation view on the left hand side of Fig. XXV, showing the oscillator means for the oscillating spray.

Fig. XXVIII is a detail sectional view taken on a line corresponding to line 28—28 of Figs. XXV, XXVI, XXVII and XXIX.

Fig. XXIX is a detail longitudinal sectional view taken on a line corresponding to line 29—29 of Figs. XXV and XXVIII.

Fig. XXX is a detail transverse sectional view taken on a line corresponding to line 30—30 of Figs. XXV, XXVI and XXIX, showing the detail of sprays and baffle means for spraying the half peaches and striking them directly on top and bottom without inverting the same.

Fig. XXXI is an enlarged detail sectional view taken on a line corresponding to line 31—31 of Fig. XXXII, showing details of the combined steam and water spray jet.

Fig. XXXII is a detail sectional view taken on a line corresponding to line 32—32 of Fig. XXXI.

Fig. XXXIII is an enlarged detail sectional view taken on a line corresponding to line 33—33 of Fig. XXXII.

In the drawing, all of the sectional views are taken looking in the direction of the little arrows at the ends of the section lines, and similar reference numerals refer to similar parts throughout the several views.

Considering the lettered and numbered parts of the drawing, I will proceed to describe the same in the order in which they are lettered and numbered in the diagrammatic Fig. I. First will be described the feed section A; second, the heating section B; third, the disintegrating spray section C; fourth, the spray washing or peeling section D; fifth, the blanching section E, which is substantially identical mechanically with section B; and sixth, the inspection section F, which is substantially identical mechanically with the feed section A. I will describe the detailed structure as a peach peeling machine, but will state that it is adapted to peeling fruit and vegetables generally. I describe it particularly as a peach peeling machine as this particular structure is especially designed for that work, and some slight modifications may be desirable for other work. This machine is especially designed for the handling of halved peaches, although whole peaches may be fed to it and be peeled successfully.

The framework of each section is composed of the corner posts or legs 1 secured together with the longitudinal outside frame bars 2 and the longitudinal inside frame bars 3 and 4. Bars 3 are secured together by the cross pieces 5 and bars 4 are secured together by the cross pieces 6. Each section is composed of sheet metal sides 7, said sides terminating in the bottom or trough 8 having the drain pipe 9, the end portions of the trough being sloping in sections A and E for draining the whole length of trough, as there shown.

On the sides of each section is secured a pair of brackets 10 to the longitudinal bars 2. In said brackets 10 are journaled the guiding rollers 11. A conveyer belt 12 is disposed to run the whole length of the machine, the upper run of said belt being disposed to travel on the longitudinal supporting bars 13 which are secured to said cross bars 5, as shown. The lower run of the belt runs over the rollers 11. The drums 14 and 15 which are at the front and rear ends of the machine carry and drive the endless belt 12.

Drum 14 is journaled in the journal blocks 16 which are adapted to slide on the ways 17. Adjusting screws 18 provided with hand wheels 19 are provided to adjust the position of the journal block 16 to give the belt 12 the proper tension. Lock nuts 20 are provided on each screw 18. The drum 14 and its supporting members are mounted on the frame 21, composed of the end pieces 22 and legs 23, all suitably secured together.

Section A is the feed section and the peaches, which are halved and pitted, are manually placed or otherwise distributed on the conveyer belt 12, skin side up and flat side down. This section is open on top.

Section B is the steaming and heating section, which is practically inclosed by the side walls 7, end walls 24 and cover 25, said cover being preferably removable. At the top of section B is disposed a plurality of steam pipes 26 supported by straps 27 to the angle side bars 28 secured to the sides 7. Pipes 26 are connected to the steam supply pipe line 29 and are controlled by globe valves 30 so that any desired amount of steam may be admitted. Pipe line 29 is connected to the outside steam source by pipe 31. On the under side of pipes 26 is a plurality of small holes 32 (Fig. VIII). Through said holes 32 steam is directed downwardly into the section B onto the skin or top side of each peach, so as to thoroughly heat the skin of the fruit as it is passing through to the next section.

From section B the fruit passes on the conveyer belt into section C, which I call the lye or disintegrator section. Disintegration may, however, occur under favorable conditions and with some fruits, such as tomatoes, in the steaming or heating section. Said section C is practically inclosed, as is section B, and consists of the said sides 7, end walls 33 and removable cover 34.

At the top of section C, which is the lyeing or peel disintegrating section, is disposed a plurality of pipes 35 through which hot lye or other disintegrating fluid is led by the depending pipes 36 to the spray nozzle 37 hereinafter described. I have connected four pipes 36 to each pipe 35. Each pipe 35 oscillates and turns in its bearings 38 at each end, said bearings being fastened to the angle iron side bars 39 which are carried by the posts 1. Each pipe is provided with rocker arms 40. The said rocker arms are pivotally connected to the rocker bar 41. An arm 42 projects from one arm 40 and is connected by the connecting rod 43 to the disk crank 44 secured to shaft 45. Shaft 45 extends laterally across section C and is driven by pulley 46 by belt 47 from driving motor 48, a suitable stuffing box joint 50 being used to connect the oscillating and stationary portions of the said pipe line. Valve 51 is connected between joint 50 and pipe line 49 and by this means permits any number of pipes 35 to be used. Hot lye is fed to pipes 35 from the supply pipe line 49. Pipe line 49 is connected by the pipe 52 to the centrifugal pump 53 mounted on the base 54. Beneath the trough 8 is disposed the lye tank 55, rectangular in form and extending the whole length of said section C. At the top of tank 55 is secured the coarse screen 56 and beneath the screen 56 is secured a fine screen 57. Said screens 56 and 57 catch and retain any solid matter which may drop into trough 8 and pass through drain 9 into the said tank. The lye in said tank 55 is connected by the intake pipe line 58 to pump 53 on the end of said pipe line 58. Within said tank 55 is secured the strainer 59 for straining the lye solution as the same is drawn to the pump. In the tank 55 is disposed a steam coil consisting of steam pipes 60 which are connected to the steam header 61 for heating the lye. Outside of tank 55 is secured the valve 62 to said header 61.

In Figs. XIII and XIV are shown a detail of the lye spray nozzles 37, somewhat similar in principle to a fruit tree spray nozzle. Each of the nozzles consist of a cast metal body 63. Through the bottom of the nozzle is the discharge hole or orifice 67. The nozzle is supplied with the lye solution through the passage 68 which is tangent to the chamber 65. Nipple 64 is threaded at 69 for securing the nozzle on a pipe 36. The body is machined to a true cylinder on the inside, forming a chamber 65 which is closed on top by the plug 66. The bottom of said chamber I form flat. Therefore as the hot lye is forced through the said passage, the same will strike the inner walls of the chamber and being forced around the same will have a rotary motion imparted thereto, and as the same escapes through orifices 67 a whirling spray will thereby be formed which will effectively spray with a fine mist the skin surface of the peaches on the conveyer belt without delivering any of the disintegrating fluid or lye on the exposed flesh of the peach.

From section C the fruit is carried on the conveyer belt to section D, which I shall call the peeling section. In this section the skin which has been disintegrated in the lye section C is removed from the peach by the action of water sprays. Section D consists of the side walls 7, the end walls 70 and the detachable cover 71.

Near the top and toward the front central portion of section D are disposed the transverse water pipes 72, while near the top and toward the rear central portion is disposed a pair of longitudinal water pipes 73. Downwardly from each pipe extend the spray pipes 74, on the lower ends of which are secured the spray nozzles 75 hereinafter described.

Between the upper and lower sides of the conveyer belt 12 are located the water pipes 76. These pipes are staggered with relation to consecutive pairs of pipes 73. To pipes 76 are also secured water nozzles 75 which, however, force the water up through the upper rim of belt 12. Beneath the upper run of said belt but in line with pipe 73 are disposed the baffle plates 77. (See Fig. XIX.) Pipes 72, 73 and 76 are adapted to be oscillated by the following means: Pipes 72 turn in bearings 78 and 79 on the opposite sides of the section, said bearings being secured to the angle side bars 80 and 81, respectively, carried by the corner posts 1. Pipes 76 turn in bearing 82 secured to the angle side bar 83 secured on one side of the section and in the hanger 84 secured on the other side of the section. Pipes 73 turn in bearings 85 and 86, said bearings 85 and 86 being secured to the cross angle bars 87 and 88. The bar 88 is secured on the outside of the rear end of the section.

On the ends of pipes 72, outside of bearings 78, are fastened the rocker arms 89 (Fig. XVII) which extend upwardly. The upper ends of said rocker arms are pivotally connected to a common rocker bar 90. One of the said rocker arms, however, is formed into a lever 91. On the said ends of pipe 76 are also secured the rocker arms 92. These rocker arms are all pivotally connected to a common rocker bar 93. One of said rocker arms is formed into the lever 94. The ends of the said levers 91 and 94 are connected by the link 95.

On the under side of angle side bar 80 is secured the depending bearing 96 (Fig. XVIII) in which is journaled the bell crank 97. The upper arm of the said bell crank is pivoted to one end of link 98, the other end of said link is pivoted to the end of rocker bar 90. To the other arm of bell crank 97 is pivotally connected rod 99. The other end of said connecting rod 99 is pivotally connected to the disk crank 100 on shaft 101. On the opposite end of crank shaft 101 is secured the belt pulley 102 driven by belt 103 from the driving motor 104. The pipes 73, 73 are oscillated by connections from link 98 which connects by link 106 (Fig. XXVII) through bell crank 108 to which it connects by ball and socket connection 107 and which connects by ball and socket joint 109 through link 110 to ball and socket joint 111 on rocker bar 112. A rocker arm 113 is secured to each pipe 73. It will thus be clear that on the actuation of link 98 the pipes 73 will also be oscillated.

Pipes 72 and 73 are connected by suitable stuffing box joints 114 and valves 115 to the common supply pipe line 116. Pipes 76 are connected through similar stuffing box joints 117 and valve 118 to the pipe line 119 which connects by pipe 120 to supply line 116. Pipe 119 is connected by pipe 121 to the outside source of supply.

The nozzles 75 are of the well known Oakland type. Details of the nozzles 75 are shown in Figs. XX and XXI, and consist of a body 122 machined out on the inside and closed by screw plug 123. In the flat bottom of said body portion is the central discharge orifice 124. This orifice is preferably tapering. Plug 123 has the supply passage 125 therein and is tapped out so as to screw onto any of the water pipes, as 74. On the bottom of said nozzle is secured the flaring deflector plate 126 disposed angularly in relation to the stream discharging from orifice 124 to spread the same.

At the rear end of the said section D are disposed the water pipes 127 which are located just a short distance above the upper rim of the conveyer belt and secured to angle bars 127' on sides 7 by straps 127''. Between the upper and lower sides of the said belt are likewise disposed water pipes 128, said pipes 128 being in a staggered relation to pipes 127. Pipes 128 are secured to angle bars 128' on sides 7 by straps 128''. Pipes 127 and 128 have a plurality of small holes 129' on their lower and upper sides respectively being directed toward the conveyer. Between pipes 127 are located the baffle plates 129 which are located directly above pipes 128. Pipes 127 are all connected to a common supply pipe 130 and pipes 128 to a common supply pipe 131, pipe 130 being suitably connected to pipe 131. Pipe 131 is connected to the pipe 119 by pipe 132, the former being an extension of the latter in this case. A valve 133 and pipe 132 are adapted to regulate the flow into both pipes 130 and 131.

From the peeling section D the fruit is conveyed into the blanching section E. This section is similar in construction and operation to section B and serves to freshen and in a measure restore the color to the peaches, the same being somewhat bleached due to the action of the lye and water. The fruit is treated with either steam or hot water or both.

From the blanching section E the peaches pass into the inspection section F, shown in Figs. XXII and XXIII, which is identical in construction to the feed section A, except it is at the delivery end of the machine.

At the end of section F is located the driving mechanism for the conveyer belt. This mechanism is all located on a suitable frame consisting of the top and side members 134 and the legs 135. Legs 135 are tied together by the member 136. The said belt passes over the drum 15 which journals in the bearings 137 secured to the top member 134. On drum shaft 138 and outside of the frame support is secured the large gear wheel 139, said gear being driven by the pinion 140 secured to the shaft 141 journaled in bearings 142 secured to the said top members. On the other end of shaft 141 is secured the gear 143 which is driven by the pinion 144 secured to the pulley shaft 145. Shaft 145 is journaled in the bearings 146 and has secured thereto the driving pulley 147. Between said pulley and bearings is disposed a clutch 148 for starting or stopping the machine. With the above train of gears, the proper speed is given to the conveyer belt 12.

The belt which I employ consists of a series of links suitably pivoted together. (See Fig. XXIV.) Each link is formed of a narrow strip of metal bent or crimped into a series of U-shaped portions having flattened ends 149 and flaring sides 150, the adjacent portions being oppositely disposed to each other. The closed end of each portion extends into the open end of its adjacent link, the inclination of sides 150 permitting this to be done. Adjacent links are fastened to each other by the pivot rod 151 which passes through suitable perforations at the ends of the sides 150. At the edge of the belt the projecting end of the pivot rod is turned in so as to engage or hook at 152, as shown.

A modified structure D' of the washing section D is shown in Figs. XXV to XXX inclusive, wherein I have used a combined steam and water spray, and thus spray and steam the fruit at the same time.

Near the top of section D' in the said modification and toward the front central portion of the same are disposed the steam pipes 153. Between the upper and lower sides of the belt 12 are likewise disposed the steam pipes 154, said pipes being located alternately in respect to pipes 153, as shown. A pair of steam pipes 155 is located above pipes 153 and run lengthwise of the said section. Pipes 153 and 155 are all connected to a common supply pipe line 156. Pipes 154 are connected by pipe 157 to supply pipe 156. Said pipes 153, 154 and 155 are oscillated by the same mechanism and connected to the supply pipe by the same means, all as shown in the preferred structure.

From pipes 153 and 155 depend the spray pipes 158 and 159 respectively. At the ends of these pipes are fastened the combined steam and water spray nozzles 160 hereinafter described. Similar nozzles are also fastened to pipes 154 and discharge upwardly through the belt 12.

Between pipes 155 is located the water pipe 161 running lengthwise of the section, said pipe 161 being secured to angle 161' by strap 161''. From pipe 161 leads the rubber hose 162 to the various nozzles 160, a sufficient length of hose being provided to permit the oscillation of pipes 153 and 155. A similar hose 163 (Fig. XXIX) is adapted to connect the nozzles on pipes 154 to the water supply pipe 164. Pipe 161 is connected by an elbow to the outside supply by pipe 165.

Beneath the nozzles connecting pipes 153 but beneath the upper length of the belt 12 are located the baffle plates 166. (Fig. XXIX.)

My combined steam and water nozzle is shown detailed in Figs. XXXI to XXXIII inclusive. The steam nozzle consists of a body portion 167 which is cored out at 168. The lower end of the said cored portion is tapered at 167' and forms the discharge opening 169 of said nozzle. Steam is led into the nozzle through the threaded opening 170 into which screws the nipple 171 for fastening the nozzle to the pipe. The water spray nozzle 172 is adapted to screw in the upper end of the said cored portion 168 of the steam nozzle. This nozzle is smaller in diameter than said portion 168 although the upper end of the same is enlarged so as to screw into the steam nozzle. The lower end of this nozzle is beveled at 173 and forms with the sloping side 167' the annular steam discharge opening 174. In the center of nozzle 172 is disposed the water discharge passage 175 which is connected by nipple 176 to hose 162.

A deflector plate 177 is disposed beneath the combination nozzle. This plate is secured to the hinge piece 178 which pivots on pin 179 secured in a pair of projecting ears 180 of steam nozzle body 167. Through the upper end of the said hinge piece 178 passes the lock pin 181 which is disposed in suitable holes in the top of ears 180. At the bottom of said ears 180 are located the holes 182. Deflector plate 177 is set at an angle to the combined steam and water discharge from the nozzle, as shown, and is held in this position by said pin 181 when the same is disposed in the holes in the top of said ears, as shown. However, when the plate is not to be used, the same may be swung out of position as shown dotted in Fig. XXXII, by removing pin 181 and inserting the same in holes 182 in member 178.

At the rear end of said modified section D' is located the group of water pipes which are disposed as pipes 127 and 128 in my preferred structure. Similar baffle plates 129 are also used and located, as in Fig. XIX.

In operating my improved apparatus and in carrying out my improved process, peaches are placed by hand or otherwise on the open-work conveyer 12 in the feed section A. The halved peaches are distributed in a single layer with the peel up and the pit sides down, the pits having been removed before the peeling operation begins. The peaches are at the ordinary temperature of the room and comparatively cool and are passed to the steaming or heating section B where jets of steam at comparatively low pressure or in comparatively small amount are directed against the peel on the surface of the peach. This heats the same at once and moistens the same with hot moist steam.

This step of the process should not be continued long enough to cook the peaches but merely long enough to insure a thorough heating and moistening of the peel on the upper surface of the halved peaches.

The conveyer then carries the peaches forward to the lye or disintegrating section C. Hot lye is there delivered in a fine spray and allowed to fall upon the peel surface of the halved peaches and thoroughly saturates the same. The lye made use of is preferably a saturate solution and at boiling temperature. The very fine misty spray entirely covers and saturates the peel surfaces of the peaches without coming into contact with the exposed pulp, which is protected beneath the peaches except that some very slight quantity of the solution will be carried along by capillarity at the edges. This will not be sufficient to do any harm, and none of the disintegrating solution can enter the comparatively roughened surfaces of the pit cavities.

As soon as the peel surfaces of the peaches have been effectively covered by the strong lye and as soon as the peel is disintegrated and before any material cooking of the pulp can occur, the belt passes into the spraying or washing section D, where sprays of cool water under pressure (the degree of pressure being under control for the work in hand) quickly removes the disintegrated peel from the upper surfaces of the peaches, and as the peaches advance in the section (as seen in Fig. XV) they are also sprayed from the under side, guards being provided above the sprays to prevent the peaches being turned over by the force of the jets from beneath. Toward the farther end of this section, the longitudinal pipes 73 are also oscillated to insure the complete washing of the upper and under surfaces of the peaches.

The nozzles in the washing section are seen in Figs. XX and XXI, and preferably are provided with deflectors that spread the sprays into thin sheets to effectively accomplish the washing and peeling. Some of the pipes are provided with direct perforations, the thin sheets of spray being most effective in accomplishing the complete washing.

When the peaches are thus washed they are carried by the belt 12 into section E, where the fruit is subjected to the action of either steam or hot water or both, for the purpose of blanching and setting the color. This section is identical with the section B. The fruit, having been thus completely treated, passes to the inspection section F where the same is taken care of by the attendants according to the practice in canneries.

In the structures appearing in Figs. XXV, XXVI, XXVII, XXVIII, XXIX, and XXX, the action of the spraying and blanching is combined within a single section, steam and water both being made use of. This is done by the special nozzles illustrated in Figs. XXXI, XXXII and XXXIII, where provision is made for the use of steam or hot water or both. The deflectors are provided whereby the same may be delivered in a thin sheet or the deflectors turned back and the spray be in the form of a cone or a direct jet. The action is regulated and controlled to meet the requirements.

While I have shown the disintegrating apparatus for disintegrating the peeling, now and then it is found that the hot steam is sufficient to loosen the peeling of peaches even, and that it is quite sufficient for loosening the peeling of tomatoes.

Sweet potatoes can be very effectively handled in the apparatus. They may be cut in halves to facilitate the operation. Whole fruit or vegetables may be passed through, as the rolling of the same will expose all surfaces, although it is ordinarily preferable that the fruit or vegetables be cut in halves, as it is much more satisfactorily handled.

The term "lye" used herein is used in its broad sense to embrace any alkaline solution. The usual lye made from wood ashes containing potash will do the work. I have found saturate solution of caustic soda to be economical and very effective, and the same can be weakened for some purposes. I am aware that the other preparations and solutions may be effectively used for disintegrating the peeling. I have shown the conveyer belt of open metal work. This conveyer can be greatly modified.

Having thus described my invention, what I claim as new and desire to secure by Letters Patent is:

1. In an apparatus for the class described, the combination of an endless open-work horizontally-disposed conveyer, means for actuating the same, a feed section thereof for the distribution of the halved peaches with the peel side up; an inclosed section with means for delivering steam jets upon the peel surfaces of said peaches; a succeeding inclosed section with spray nozzles for delivering a fine spray of disintegrating caustic soda solution upon the heated peel surfaces of said peaches, a succeeding inclosed section with spray nozzles disposed above and below said conveyer for delivering sprays of water on the surface of the halved peaches both above and below, with guards disposed opposite the lower sprays and at a distance above the conveyer sufficient to permit the peaches to pass beneath without being overturned; means for oscillating said spray pipes, a succeeding inclosed section with steam jets for treating the peaches; and a final section for inspection purposes, coacting for the purpose specified.

2. In an apparatus of the class described, the combination of an endless open-work horizontally-disposed conveyer; means for actuating the same, a feed section thereof for the distribution of the halved peaches with the peel side up; an inclosed section with means for delivering steam jets upon the peel surfaces of said peaches; a succeeding inclosed section with spray nozzles for delivering a fine spray of disintegrating caustic soda solution upon the heated peel surfaces of said peaches, a succeeding inclosed section with spray nozzles for delivering sprays of water on the surface of the halved peaches both above and below, means for oscillating said spray pipes, a succeeding inclosed section with steam jets for treating the peaches; and a final section for inspection purposes, coacting for the purpose specified.

3. In an apparatus of the class described, the combination of an endless open-work horizontally-disposed conveyer; means for actuating the same, a feed section thereof for the distribution of the halved peaches with the peel side up; an inclosed section with means for delivering steam jets upon the peel surfaces of said peaches; a succeeding inclosed section with spray nozzles for delivering a fine spray of disintegrating caustic soda solution upon the heated peel surfaces of said peaches, a succeeding inclosed section with spray nozzles for delivering sprays of water on the surface of the halved peaches both above and below, means for oscillating said spray pipes, a succeeding inclosed section with steam jets for treating the peaches; coacting for the purpose specified.

4. In an apparatus of the class described, the combination of an endless open-work horizontally-disposed conveyer; means for actuating the same, a feed section thereof for the distribution of the halved peaches with the peel side up; an inclosed section with means for delivering steam jets upon the peel surfaces of said peaches; a succeeding inclosed section with spray nozzles for delivering a fine spray of disintegrating caustic soda solution upon the heated peel surfaces of said peaches, a succeeding inclosed section with spray nozzles for delivering sprays of water on the surface of the halved peaches both above and below, means for oscillating said spray pipes, coacting for the purpose specified.

5. In an apparatus of the class described, the combination of an endless open-work horizontally-disposed conveyer, means for actuating the same, a feed section thereof for the distribution of the halved peaches with the peel side up; an inclosed section with means for delivering steam jets upon the peel surfaces of said peaches; a succeeding inclosed section with spray nozzles for delivering a fine spray of disintegrating caustic soda solution upon the heated peel surfaces of said peaches, a succeeding inclosed section with spray nozzles disposed above and below said conveyer for delivering sprays of water on the surface of the halved peaches both above and below, with guards disposed opposite the lower sprays and at a distance above the conveyer sufficient to permit the peaches to pass beneath without being overturned; means for oscillating said spray pipes; coacting for the purpose specified.

6. In an apparatus of the class described, the combination of an endless open-work horizontally-disposed conveyer, means for actuating the same, a feed section thereof for the distribution of the halved peaches with the peel side up; a succeeding inclosed section with spray nozzles for delivering a fine spray of disintegrating caustic soda solution upon the heated peel surfaces of said peaches, a succeeding inclosed section with spray nozzles disposed above and below said conveyer for delivering sprays of water on the surface of the halved peaches both above and below, with guards disposed opposite the lower sprays and at a distance above the conveyer sufficient to permit the peaches to pass beneath without being overturned; means for oscillating said spray pipes, a succeeding inclosed section with steam jets for treating the peaches; and a final section for inspection purposes, coacting for the purpose specified.

7. In an apparatus of the class described, the combination of an endless open-work horizontally-disposed conveyer; means for actuating the same, a feed section thereof for the distribution of the halved peaches with the peel side up; a succeeding inclosed section with spray nozzles for delivering a fine spray of disintegrating caustic solution upon the heated peel surfaces of said peaches, a succeeding inclosed section with spray nozzles for delivering sprays of water on the surface of the halved peaches both above and below, means for oscillating said spray pipes, a succeeding inclosed section with steam jets for treating the peaches, and a final section for inspection purposes, coacting for the purpose specified.

8. In an apparatus of the class described, the combination of an endless open-work horizontally-disposed conveyer, means for actuating the same, a feed section thereof for the distribution of the halved peaches with the peel side up; a succeeding inclosed section with spray nozzles for delivering a fine spray of disintegrating caustic soda solution upon the heated peel surfaces of said peaches, a succeeding inclosed section with spray nozzles disposed above and below said conveyer for delivering sprays of water on the surface of the halved peaches both above and below, with guards disposed opposite the lower sprays and at a distance above the conveyer sufficient to permit the peaches to pass beneath without being overturned; means for oscillating said spray pipes; coacting for the purpose specified.

9. In a peach peeling apparatus, the combination of an endless open-work conveyer, spray means above and below the same, and guards disposed in opposite relation to the lower sprays at a distance above the conveyer sufficient to permit the passage of the halved peaches, pit sides down, without overturning the same, as specified.

10. In a peach peeling apparatus, the combination of an endless open-work conveyer, spray means above and below the same, guards disposed in opposite relation to the lower sprays at a distance above the conveyer sufficient to permit the passage of the halved peaches, pit sides down, without overturning the same, pipes with spray nozzles delivering therefrom, and means for oscillating the said pipes.

11. A section in a peach peeling apparatus comprising an open-work conveyer, spray nozzles disposed above the same comprising an outer annular steam nozzle, with inwardly deflected and aimed outer member and a central water jet, and a removable deflector adjustable at an angle into the path of said jets whereby either steam or water or both may be projected against the fruit.

12. The process of treating peaches consisting in placing the halved peaches, skin sides up, on a suitable open-work conveyer, heating the peel surfaces by steam jets directed thereagainst, spraying with a strong solution of caustic soda the heated peel surfaces of the peaches to disintegrate the said peel, and immediately the said peel is disintegrated subjecting the same to a peeling and washing spray action, as specified.

13. The process of treating fruit or vegetables consisting in spraying the peel surfaces with a disintegrating solution to penetrate and disintegrate the same, and immediately the said peel is disintegrated subjecting the same to a peeling and washing spray action.

14. The process of treating fruit or vegetables consisting in heating the peel surfaces by steam jets directed thereagainst, spraying the peel surfaces until dampened with a disintegrating solution, and removing the disintegrated peel by the action of water sprays, as specified.

15. The process of treating fruit or vegetables consisting in spraying the peel surfaces until dampened with a disintegrating solution, and removing the disintegrated peel by the action of water sprays, as specified.

16. In a process for chemically peeling fruit and the like, the steps comprising the continuous filtration and return delivery of the chemical solution utilized.

In witness whereof, I have hereunto set my hand and seal in the presence of two witnesses.

SAMUEL J. DUNKLEY. [L. S.]

Witnesses:
LUELLA G. GREENFIELD,
MARGARET L. GLASGOW.